(12) United States Patent
Kim et al.

(10) Patent No.: US 7,514,502 B2
(45) Date of Patent: Apr. 7, 2009

(54) THERMOPLASTIC RESIN COMPOSITION HAVING IMPROVED EXTERNAL APPEARANCE AND EXCELLENT WEATHERABILITY

(75) Inventors: Dong-sung Kim, Daejeon (KR); Chan-hong Lee, Daejeon (KR); Seong-lyong Kim, Daejeon (KR); Han-jong You, Uijeongbu-si (KR)

(73) Assignee: LG Chem, Ltd. (KR)

( * ) Notice: Subject to any disclaimer, the term of this patent is extended or adjusted under 35 U.S.C. 154(b) by 471 days.

(21) Appl. No.: 10/560,014

(22) PCT Filed: Nov. 6, 2003

(86) PCT No.: PCT/KR03/02363

§ 371 (c)(1),
(2), (4) Date: Dec. 8, 2005

(87) PCT Pub. No.: WO2004/108823

PCT Pub. Date: Dec. 16, 2004

(65) Prior Publication Data

US 2006/0148992 A1 Jul. 6, 2006

(30) Foreign Application Priority Data

Jun. 9, 2003 (KR) .................. 10-2003-0036846

(51) Int. Cl.
*C08L 51/04* (2006.01)
(52) U.S. Cl. ............................. 525/71; 525/85; 525/86; 525/87
(58) Field of Classification Search .................. 525/71, 525/85, 86, 87
See application file for complete search history.

(56) References Cited

U.S. PATENT DOCUMENTS

| 4,224,419 A | * | 9/1980 | Swoboda et al. ............... 525/71 |
| 4,579,909 A | | 4/1986 | Giles, Jr. et al. ............. 525/148 |
| 5,053,456 A | | 10/1991 | Dufour ......................... 525/74 |
| 5,213,697 A | * | 5/1993 | Vinci et al. .................. 508/460 |
| 5,476,126 A | | 12/1995 | Hilliard, Jr. et al. ........... 141/63 |
| 5,683,815 A | * | 11/1997 | Leiss ....................... 428/424.4 |
| 6,339,127 B1 | * | 1/2002 | Miyatake et al. ............. 525/108 |
| 2003/0105225 A1 | * | 6/2003 | Breulmann et al. ........... 525/63 |
| 2007/0147913 A1 | * | 6/2007 | Katano et al. ................ 399/325 |

FOREIGN PATENT DOCUMENTS

| JP | 02-091143 | 3/1990 |
| KR | 1020020038017 A | 5/2002 |
| KR | 1020020038366 | 5/2002 |
| WO | WO 02/062890 A1 | 8/2002 |

OTHER PUBLICATIONS

Fowler, et al., "Effect of copolymer composition on the miscibility of blends of styrene-acrlyonitrile copolymers with poly(methyl methacrylate," Polymer, vol. 28, pp. 1177-1184 , (1987).

Schafer, et al. "Morphology and phase behaviour of poly(methyl methacrylate)/poly(styrene-co-acrylonitrile) blends monitored by FTi.r. microscopy," Polymer, vol. 38, No. 15, pp. 3745-3752, (1997).

* cited by examiner

*Primary Examiner*—Jeffrey C Mullis
(74) *Attorney, Agent, or Firm*—Cantor Colburn LLP

(57) ABSTRACT

The present invention relates to an acrylonitrile (ASA) type thermoplastic resin composition with excellent weatherability and appearance properties, and more particularly, to an acrylate-styrene-acrylonitrile type thermoplastic resin composition comprising a) an acrylate-styrene-acrylonitrile graft copolymer; b) a butadienc-acrylonitrile methylmethacrylate graft copolymer; c) a copolymer of aromatic vinyl compound and vinylcyanide compound; and d) an alkyl acrylate copolymer, which has remarkably improved appearance properties such as scratch resistance, color (color stability) and gloss as well as excellent basic properties and weatherability.

18 Claims, No Drawings

THERMOPLASTIC RESIN COMPOSITION HAVING IMPROVED EXTERNAL APPEARANCE AND EXCELLENT WEATHERABILITY

TECHNICAL FIELD

The present invention relates to an acrylate-styrene-acrylonitrile type thermoplastic resin composition. More particularly, it relates to an acrylate-styrene-acrylonitrile type thermoplastic resin composition having appearance properties such as scratch resistance, color and gloss improved by adding a butadiene-styrene-methylmethacrylate copolymer and an alkyl acrylate copolymer which have good compatibility with acrylate-styrene-acrylonitrile resin.

BACKGROUND ART

The acrylate-styrene-acrylonitrile (ASA, terpolymer) resin has excellent processability, impact resistance and weatherability, as compared to butadiene-styrene-acrylonitrile (ABS) resin. Owing to its beneficial properties, it rapidly substitutes for paint-coated articles used for the outdoors and thus, be widely used in automotive parts, construction elements, sport supplies and the like. However, upon comparision with the conventional paint-coated articles, it still has shortcomings of deterioration in appearance properties such as scratch resistance, color stability, gloss and the like, causing deterioration of product quality.

As the most widely utilized method to improve appearance properties of the acrylate-styrene-acrylonitrile (ASA) resin, there has been proposed a method for blending the acrylate-styrene-acrylonitrile resin with a second resin which can supplement the weak properties of the acrylate-styrene-acrylonitrile. A representative example is a blend with methylmethacrylate (PMMA, Poly methyl methacrylate) resin. The methylmethacrylate resin has excellent weatherability, mechanical properties and surface scratch resistance and thus, is widely used in outdoor products. The compatibility of ASA (SAN) resin with the methylmethacrylate resin blend in the industrial aspect has been already reported in various literatures by Fower et al. (Polymer, 1987, vol 28, 1177 to 1184) and by Schafer et al. (Polymer, 1997, vol 38, 3745 to 3752). Also, acrylate-styrene-acrylonitrile/methylmethacrylate blend(ASA/PMMA) resin has been already commercialized. However, the blending method may affect adversely, such as reduction in gloss of the final blend product, when the molecular weight of the methylmethacrylate is wrongly selected, causing deterioration of appearance properties. Further, the product has poor impact strength at low temperature.

In addition, U.S. Pat. Nos. 6,476,126 and 4,579,909 disclose methods for producing a thermoplastic resin having excellent basic physical properties and appearance properties and weatherability, which comprises a 3-component blend of acrylate-styrene-acrylonitrile/methylmethacrylate/polycarbonate(ASA/PMMA/PC). The method has problems in that the resin has poor formability due to low flowability and also has poor economical efficiency, though it satisfies all the appearance properties as described above.

DISCLOSURE OF INVENTION

In order to solve the above problems, thus, it is an object of the present invention to provide an acrylate-styrene-acrylonitrile type thermoplastic resin composition having excellent basic physical properties, weatherability and good appearance properties such as scratch resistance, color stability and gloss by blending an acrylate-styrene-acrylonitrile resin with a terpolymer of butadiene-styrene-methylmethacrylate and an alkyl acrylate copolymer.

The above and other objects can be accomplished by the present invention described below.

To achieve the above objects, the present invention provides a thermoplastic resin composition comprising:

(1) 5 to 30 parts by weight of a small diameter graft alkyl acrylate-styrene-acrylonitrile;

(2) 10 to 40 parts by weight of a large diameter graft alkyl acrylate-styrene-acrylonitrile;

(3) 10 to 70 parts by weight of an aromatic vinyl compound-vinylcyanide copolymer;

(4) 10 to 30 parts by weight of a butadiene-styrene-methylmethacrylate resin; and (5) 1 to 10 parts by weight of an alkyl acrylate copolymer, based on 100 parts by weight of the sum of (1), (2), (3) and (4).

The small diameter graft acrylate-styrene-acrylonitrile copolymer may be comprised of 5 to 50 parts by weight of a small diameter alkyl acrylate rubber latex, 10 to 50 parts by weight of an aromatic vinyl compound and 1 to 20 parts by weight of a vinylcyanide compound.

The large particle diameter graft acrylate-styrene-acrylonitrile copolymer may be comprised of 10 to 60 parts by weight of a large particle diameter alkyl acrylate rubber latex, 10 to 40 parts by weight of an aromatic vinyl compound and 1 to 20 parts by weight of a vinylcyanide compound.

The alkyl acrylate rubber latex may be prepared from an alkyl acrylate monomer by emulsion polymerization with an emulsifying agent, an initiator, a grafting agent, a crosslinking agent and an electrolyte as additives.

The alkyl acrylate monomer may be butyl acrylate or ethyl hexylacrylate.

The small diameter graft acrylate-styrene-acrylonitrile copolymer has a particle size of 500 to 2000 Å and the large particle diameter graft acrylate-styrene-acrylonitrile copolymer has a particle size of 2500 to 5000 Å.

The aromatic vinyl compound-vinylcyanide compound copolymer may be comprised of 60 to 75 parts by weight of an aromatic vinyl compound and 25 to 40 parts by weight of a vinylcyanide.

The butadiene-styrene-methylmethacrylate copolymer may be comprised of 8 to 20 parts by weight of a polybutadiene rubber latex, 40 to 70 parts by weight of a methacrylic acid alkyl ester compound or an acrylic acid alkyl ester compound, 15 to 30 parts by weight of an aromatic vinyl compound and 1 to 10 parts by weight of a vinylcyanide compound.

The aromatic vinyl compound may be at least one selected from the group consisting of styrene, alpha-methylstyrene and para-methylstyrene.

The vinylcyanide compound may be acrylonitrile.

The alkyl acrylate copolymer has a core-shell structure, in which an acrylate rubber particle in the core comprises a seed comprising 4.9 to 14.9 parts by weight of $C_2$-$C_8$ alkyl acrylate and 0.1 to 5.0 parts by weight of a crosslinking agent, and a first core layer comprising 40 to 90 parts by weight of $C_2$-$C_8$ alkyl acrylate and 0.1 to 5.0 parts by weight of a crosslinking agent; a second core layer comprising 40 to 90 parts by weight of $C_2$-$C_8$ alkyl acrylate; and the shell comprises 5 to 30 parts by weight of $C_3$-$C_4$ alkyl methacrylate.

The alkyl acrylate may be at least one selected from the group consisting of methyl acrylate, ethyl acrylate, propyl acrylate, isopropyl acrylate, butyl acrylate, hexyl acrylate, octyl acrylate and 2-ethylhexyl acrylate.

BEST MODE FOR CARRYING OUT THE INVENTION

The present invention is described in detail as follows.

(1) Preparation of the Graft Acrylate-styrene-acrylonitrile Polymer Having a Small Diameter(ASA-1)

i) Preparation of the Alkyl Acrylate Rubber Latex Having a Small Diameter

The small diameter alkyl acrylate rubber latex is prepared from an alkyl acrylate monomer by emulsion polymerization. Examples of the alkyl acrylate monomer used in preparation of the rubber latex include butyl acrylate and ethyl hexylacrylate, preferably butyl acrylate. The content of the alkyl acrylate monomer is preferably 5 to 50 parts by weight, based on 100 parts by weight of the total monomer weight.

As additives to prepare the small diameter alkyl acrylate rubber latex, an emulsifying agent, an initiator, a grafting agent, a crosslinking agent, an electrolyte and the like may be used.

Examples of the emulsifying agent which can be used in the present invention include $C_{12}$-$C_{18}$ alkyl sulfosuccinate metal salt derivatives and $C_{12}$-$C_{20}$ alkyl sulfate ester or sulfonate metal salt derivatives, which have pH 3 to 9. Examples of usable $C_{12}$-$C_{18}$ alkyl sulfosuccinate metal salt derivatives include sodium or potassium salts of dicyclohexyl sulfosuccinate and di-2-ethylhexyl sulfosuccinate. The $C_{12}$-$C_{20}$ sulfate ester or sulfonate metal salts include alkyl sulfate metal salts such as sodium lauryl sulfate and sodium dodecyl sulfate. Preferably, sodium di-2-ethylhexyl sulfosuccinate may be used. The content of the emulsifying agent is 1 to 3 parts by weight, based on 100 parts by weight of the total monomer weight.

As the initiator, inorganic or organic peroxide compounds may be used, which, for example, include water soluble initiators such as potassium persulfate, sodium persulfate or ammonium persulfate and oil-soluble initiators such as cumene hydroperoxide or benzoyl peroxide. The content of the initiator is preferably 0.05 to 0.2 parts by weight, based on 100 parts by weight of the total monomer weight.

As the crosslinking agent, ethylene glycol dimethacrylate, diethylene glycol dimethacrylate, 1,6-hexandiol dimethacrylate and the like may be used. The content of the crosslinking agent is 0.05 to 0.3 parts by weight, based on 100 parts by weight of the total monomer weight.

As the electrolyte, $NaHCO_3$, $Na_2S_2O_7$ or $K_2CO_3$, preferably $NaHCO_3$, may be used. The content of the electrolyte is preferably 0.05 to 0.4 parts by weight, based on 100 parts by weight of the total monomer weight.

In the polymerization of the alkyl acrylate rubber latex, addition of the monomer may be carried out by continuous addition, which may be used alone or in combination with whole addition.

The pH of alkyl acrylate rubber latex is preferably in the range of 5 to 9, more preferably 6 to 8.

The polymerized small diameter alkyl acrylate rubber latex has preferably a particle size of 500 to 2000 Å, more preferably 700 to 1500 Å.

ii) Preparation of Graft Acrylate-styrene-acrylonitrile Polymer

In the graft reaction, the aromatic vinyl compound may be styrene monomer derivatives, including, for example, styrene, alpha-methyl styrene, para-methylstyrene and the like, preferably styrene. The content of the aromatic vinyl compound is preferably 10 to 50 parts by weight, based on the total weight of resin composition.

As the vinylcyanide compound, acrylonitrile may be preferably used. The content thereof is preferably 1 to 20 parts by weight, based on the total weight of polymer composition.

The emulsifying agent used for preparing the acrylate-styrene-acrylonitrile polymer should have pH in aqueous solution of 9 to 13 and its preferred examples include metal salts of carboxylic acid such as metal salts of $C_{12}$-$C_{20}$ fatty acid, metal salts of rosinic acid and the like. Examples of the metal salts of fatty acid include sodium or potassium salts of fatty acid, laurylic acid and oleic acid, and examples of the metal salts of rosinic acid include sodium or potassium salts of rosinic acid. Preferably, the content of the emulsifying agent is 0.1 to 1.0 parts by weight.

Examples of the initiator which can be used for preparing the acrylate-styrene-acrylonitrile polymer include water soluble initiators such as potassium persulfate, sodium persulfate or ammonium persulfate and oil-soluble initiators such as cumene hydroperoxide or benzoyl peroxide. The content thereof is preferably 0.05 to 0.3 parts by weight, based on the total weight of polymer composition.

Since the whole addition method may suddenly raise pH of the polymerization system, grafting may not be sufficiently accomplished. As a result, stability of particles is deteriorated and thus, the interior structure of each particle becomes non-uniform. Therefore, it is preferred to use the continuous addition method for the addition of a monomer mixture including an emulsifying agent in the graft reaction.

The molecular weight controller, which is added to control a molecular weight of the graft polymer, may be preferably tert-dodecylmercaptan. The content thereof is preferably less than 0.2 parts by weight. When the content exceeds 0.2 parts by weight, the impact strength is significantly reduced.

The pH of acrylate-styrene-acrylonitrile copolymer having a small diameter alkyl acrylate rubber is preferably 8 to 11, more preferably 9 to 10.5.

(2) Preparation of the Graft Acrylate-styrene-acrylonitrile Polymer Having a Large Diameter(ASA-2)

i) Preparation of the Alkyl Acrylate Rubber Latex Having a Large Diameter

A large diameter alkyl acrylate rubber latex is prepared by emulsion polymerization of an alkyl acrylate monomer. Examples of the alkyl acrylate monomer, which can be used in the rubber latex, include butyl acrylate and ethyl hexylacrylate, preferably butyl acrylate. The content thereof is preferably 10 to 60 parts by weight, based on 100 parts by weight of the total monomer weight.

As additives in preparation of the large diameter alkyl acrylate rubber latex, an emulsifying agent, an initiator, a grafting agent, a crosslinking agent, an electrolyte and the like may be used.

Examples of the emulsifying agent, which can be used in the present invention, include $C_{12}$-$C_{18}$ alkyl sulfosuccinate metal salt derivatives, and $C_{12}$-$C_{20}$ alkyl sulfate ester and sulfonate metal salt derivatives, which have pH 3 to 9. Examples of usable $C_{12}$-$C_{18}$ alkyl sulfosuccinate metal salt derivatives include sodium or potassium salts of dicyclohexyl sulfosuccinate and di-2-ethylhexyl sulfosuccinate. Preferably, sodium di-2-ethylhexyl sulfosuccinate may be used. The content thereof is 0.1 to 1.0 parts by weight, based on 100 parts by weight of the total monomer weight.

As the initiator, inorganic or organic peroxide compounds may be used, which, for example, include water soluble initiators such as potassium persulfate, sodium persulfate or ammonium persulfate and oil-soluble initiators such as cumene hydroperoxide or benzoyl peroxide. The content thereof is preferably 0.05 to 0.2 parts by weight, based on 100 parts by weight of the total monomer weight.

As the crosslinking agent, ethylene glycol dimethacrylate, diethylene glycol dimethacrylate, 1,3-butandiol dimethacrylate, 1,6-hexandiol dimethacrylate trimethylolpropane trimethacrylate, trimetylolmethanetrimethacrylate and the like may be used. The content thereof is 0.05 to 0.3 parts by weight, based on 100 parts by weight of the total monomer weight.

As the electrolyte, $NaHCO_3$, $Na_2S_2O_7$ or $K_2CO_3$, preferably $NaHCO_3$, may be used. The content thereof is preferably 0.05 to 0.4 parts by weight, based on 100 parts by weight of the total monomer weight.

The pH of large diameter alkyl acrylate rubber latex is preferably in the range of 5 to 9, more preferably 6 to 8.

The polymerized large diameter alkyl acrylate rubber latex has preferably a particle size of 2500 to 5000 Å, more preferably 3000 to 4500 Å.

ii) Preparation of Graft Acrylate-styrene-acrylonitrile Polymer

In the graft reaction, the aromatic vinyl compound may be styrene monomer derivatives, including, for example, styrene, alpha-methyl styrene, para-methylstyrene and the like, preferably styrene. The content thereof is preferably 10 to 40 parts by weight, based on the total weight of polymer composition.

As the vinylcyanide compound, acrylonitrile may be preferably used. The content thereof is preferably 1 to 20 parts by weight based on total polymer composition.

The emulsifying agent used for preparing the acrylate-styrene-acrylonitrile polymer should have pH in aqueous solution of 9 to 13 and its preferred examples include metal salts of carboxylic acid such as metal salts of $C_{12}$-$C_{20}$ fatty acid, metal salts of rosinic acid and the like. Examples of the metal salts of fatty acid include sodium or potassium salts of fatty acid, laurylic acid and oleic acid, and examples of the metal salts of rosinic acid include sodium or potassium salts of rosinic acid. Preferably, the content of the emulsifying agent is 1 to 2 parts by weight.

Examples of the initiator used for preparing the acrylate-styrene-acrylonitrile polymer include water soluble initiators such as potassium persulfate, sodium persulfate or ammonium persulfate and oil-soluble initiators such as cumene hydroperoxide or benzoyl peroxide. The content thereof is preferably 0.05 to 0.3 parts by weight, based on the total weight of polymer composition.

(3) Preparation of Aromatic Vinyl Compound-vinylcyanide Compound Copolymer

The aromatic vinyl compound-vinylcyanide compound copolymer is prepared by continuous mass polymerization. The aromatic vinyl compound may be styrene monomers, including styrene, alpha-methylstyrene and para-methylstyrene. In the present invention, alpha-methylstyrene is preferably used in consideration of thermal resistance. The vinylcyanide compound is preferably acrylonitrile. It is prepared by homogeneously mixing 60 to 75 parts by weight of alpha-methyl styrene, 25 to 40 parts by weight of acrylonitrile, 0 to 15 parts by weight of a solvent and 0.05 to 0.3 parts by weight of organic peroxide as an initiator and continuously introducing the mixture to a reactor.

The solvent used in preparation of the alpha-methylstyrene-acrylonitrile (AMS-SAN) copolymer includes ethylbenzene, toluene, xylene, methylethyl ketone and the like. Among them, toluene having a low boiling point is preferably used, since alpha-methylstyrene has a high boiling point.

The organic peroxide initiator includes 1,1-bis-tert-butylperoxi cyclohexane, 2,2-bis-tert-butylperoxibutane and the like, preferably di-tert-butylperoxide, dicumyl peroxide and tert-butylcumyl peroxide.

The alpha-methylstyrene-acrylonitrile copolymer prepared as described above comprises 68 to 73 parts by weight of alpha-methylstyrene and 27 to 32 parts by weight of acrylonitrile.

(4) Preparation of Butadiene-styrene-methylmethacrylate Copolymer i) Preparation of Polybutadiene Rubber Latex The polybutadiene rubber latex is prepared by introducing 100 parts by weight of 1,3-butadiene, 1 to 4 parts by weight of emulsifying agent, 0.2 to 1.5 parts by weight of a polymerization initiator, 0.5 parts by weight of an electrolyte, 0.1 to 0.5 parts by weight of a molecular weight controller, 75 parts by weight of ion exchange water at once into a reactor and carrying out emulsion polymerization at 65° C. to 80° C. to obtain polybutadiene rubber latex having an average particle size of 2,500 Å to 5,000 Å, a gel content of 60% to 95% and a swelling index of 12 to 40.

As the emulsifying agent, alkylaryl sulfonate, alkali methyl alkyl sulfate, sulfonated alkyl ester and the like may be used. They can be used alone or as a mixture of two or more thereof.

As the polymerization initiator, water-soluble persulfates or peroxide compounds may be used. Suitable water-soluble persulfates include sodium and potassium persulfate. Suitable oil-soluble polymerization initiators include cumenehydro peroxide, diisopropyl benzenehydroperoxide, azobisisobutylnitrile, which may be used alone or as a mixture of two or more thereof.

As the electrolyte, KCl, NaCl, $KHC_{O3}$, $NaHCO_3$, and $K_2CO3$ may be used and as the molecular weight controller, mercaptans may be used.

ii) Preparation of Graft Butadiene-styrene-methylmethacrylate Copolymer 8 to 20 parts by weight, preferably 8 to 15 parts by weight, of the polybutadiene rubber latex prepared as described above is introduced into a reactor. When the rubber latex exceeds 20 parts by weight, the weatherability of the final acrylate-styrene-acrylonitrile blend resin is deteriorated. Thereto, 40 to 70 parts by weight of a methacrylic acid alkyl ester compound or an acrylic acid alkyl ester compound is added. When the alkyl ester compound is less than 40 parts by weight, the final acrylate-styrene-acrylonitrile blend resin shows poor appearance properties. Then, 15 to 30 parts by weight of an aromatic vinyl compound, 1 to 10 parts by weight of a vinylcyanide compound, 0.2 to 0.6 parts by weight of an emulsifying agent, 0.05 to 0.3 parts by weight of a polymerization initiator are added to carry out graft copolymerization. Here, the polymerization temperature is suitably 65° C. to 80° C. and the polymerization time is suitably 4 to 7 hours. Examples of the emulsifying agent used in polymerization include alkylaryl sulfonates, fatty acid soaps, alkali metal salts of rosinic acid, which can be used alone or as a mixture of two or more thereof. As the molecular weight controller, tert-dodecyl mercaptan is typically used. As the polymerization initiator, peroxides such as cumenehydro peroxide and diisopropylbenzene hydroperoxide may be used. The latex obtained from polymerization has a polymerization conversion of 98% or higher. The latex was mixed with an antioxidant and a stabilizer, and coagulated with solution of calcium chloride at 80° C. or higher, followed by dehydration and drying to obtain powder.

(5) Preparation of Alkyl Acrylate Copolymer

The alkyl acrylate copolymer has a core/shell structure, in which the core comprises acrylate rubber particles, each comprising i) a seed comprising 4.9 to 14.9 parts by weight of $C_2$-$C_8$ alkyl acrylate and 0.1 to 5.0 parts by weight of crosslinking agent; ii) a first core layer comprising 40 to 90 parts by weight of $C_2$-$C_8$ alkyl acrylate and 0.1 to 5.0 parts by weight of crosslinking agent; and iii) a second core layer comprising 40 to 90 parts by weight of $C_2$-$C_8$ alkyl acrylate, based on the total weight of the acryl type copolymer.

The alkyl acrylate of i), ii) and iii) may be at least one monomer selected from the group consisting of methyl acrylate, ethyl acrylate, propyl acrylate, isopropyl acrylate, butyl acrylate, hexyl acrylate, octyl acrylate and 2-ethylhexyl acrylate, or homopolymers or copolymers thereof, preferably butyl acrylate, 2-ethylhexyl acrylate and a mixture thereof.

In the shell of the acrylate copolymer, the monomer may be $C_1$-$C_4$ alkyl methacrylate, preferably methylmethacrylate. The content thereof is 5 to 30 parts by weight.

The acryl type copolymer may be obtained by aggregating latex with an electrolyte, organic acid or inorganic acid, followed by filtration and drying. As the electrolyte, calcium chloride and magnesium sulfate may be used.

An acrylate-styrene-acrylonitrile thermoplastic resin composition in accordance with the present invention comprises (1) the small diameter graft acrylate-styrene-acrylonitrile copolymer, (2) the large diameter graft acrylate-styrene-acrylonitrile copolymer, (3) the alpha-methylstyrene-acrylonitrile (AMS-SAN) resin, (4) the butadiene-styrene-methylmethacrylate copolymer and (5) the alkyl acrylate copolymer. A heat stabilizer, a lubricant and a light stabilizer are added thereto and mixed at 210° C. to 230° C. The mixture is palletized using a twin screw extruder. The pellets are injection-molded. The product is measured for basic properties, weatherability, scratch resistance, colorability and gloss. The basic physical properties are measured according to ASTM. The weatherability is examined on an accelerated weather resistance tester Ci35A (ATLAS) over 1,000 hours. A specimen is measured for its color difference (ΔE) between before and after the test. As appearance properties, the scratch resistance is measured by pencil hardness and the gloss is measured according to ASTM D (45 degree). The colorability is examined by measuring color difference (ΔE) when equal amount of a black pigment is added to the acrylate-styrene-acrylonitrile blend resin according to the present invention and a pure acrylate-styrene-acrylonitrile resin as a standard.

The present invention will be explained in detail by the following examples but is not limited thereto.

EXAMPLE 1

(A) Preparation of Graft Acrylate-styrene-acrylonitrile Resin (A-1) Preparation of Small Diameter Alkyl Acrylate Rubber Latex 70 parts by weight of distilled water, 10 parts by weight of butylacrylate, 1.5 parts by weight of sodium di-2-ethylhexylsulfosuccinate, 0.02 parts by weight of ethyleneglycoldimethacrylate, 0.1 parts by weight of sodium bicarbonate and 0.04 parts by weight of potassium persulfate were introduced to a 10 L reactor, heated to 70° C. and reacted for 1 hour to prepare seed latex.

Then, a mixture of 34 parts by weight of distilled water, 0.5 parts by weight of di-2-ethylhexylsulfosuccinate, 30 parts by weight of butylacrylate and 0.1 parts by weight of sodium bicarbonate and 0.06 parts by weight of potassium persulfate as a catalyst were continuously added thereto at 70° C. for 3 hours to carry out polymerization. After completion of the reaction, the resulting rubber latex has a particle size of 800 to 1000 Å.

(A-2) Preparation of Small Diameter Graft Acrylate-styrene-acrylonitrile Polymer To the alkyl acrylate rubber latex, a mixture of 63 parts by weight of distilled water, 1.4 parts by weight of potassium rosinate, 0.042 parts by weight of potassium hydroxide (KOH), 40 parts by weight of styrene (ST), 20 parts by weight of acrylonitrile (AN) and 0.05 parts by weight of tert-dodecyl mercaptan (TDDM) and 0.1 parts by weight of potassium persulfate (KPS) as a catalyst were continuously introduced at 70° C. for 5 hours to carry out polymerization. In order to increase polymerization conversion, the reaction was continued for further 1 hour at 80° C. and cooled to 60° C.

The small diameter graft acrylate-styrene-acrylonitrile polymer prepared by the above method has a particle size of 1200 Å, polymerization conversion was 98%, pH was 9.5 and graft rate was 40%.

The resulting acrylate-styrene-acrylonitrile resin was coagulated at atmospheric pressure with calcium chloride solution at 85° C., aged at 95° C., dehydrated, washed and dried using hot air at 90° C. for 30 minutes to obtain the final acrylate-styrene-acrylonitrile powder particles.

(B) Preparation of Large Diameter Graft Acrylate-styrene-acrylonitrile Resin (B-1) Preparation of Large Diameter Alkyl Acrylate Rubber Latex 70 parts by weight of distilled water, 5 parts by weight of butylacrylate, 0.015 parts by weight of sodium di-2-ethylhexylsulfosuccinate, 0.02 parts by weight of ethyleneglycoldimethacrylate, 0.1 parts by weight of sodium bicarbonate and 0.04 parts by weight of potassium persulfate were introduced to 10 L reactor, heated to 70° C. and reacted for 1 hour to prepare seed latex.

Then, a mixture of 34 parts by weight of distilled water, 0.285 parts by weight of sodium di-2-ethylhexylsulfosuccinate, 45 parts by weight of butylacrylate and 0.1 parts by weight of sodium bicarbonate and 0.06 parts by weight of potassium persulfate as a catalyst were continuously added thereto at 70° C. for 3 hours to carry out polymerization. After completion of the reaction, the resulting rubber latex has a particle diameter of 3000 to 4000Å.

(B-2) Preparation of Large Diameter Graft Acrylate-styrene-acrylonitrile Polymer To the alkyl acrylate rubber latex, a mixture of 63 parts by weight of distilled water, 1.4 parts by weight of potassium rosinate, 0.042 parts by weight of potassium hydroxide (KOH), 35 parts by weight of styrene (ST), 15 parts by weight of acrylonitrile (AN) and 0.05 parts by weight of tert-dodecyl mercaptan (TDDM) and 0.1 parts by weight of potassium persulfate (KPS) as a catalyst were continuously added at 70° C. for 5 hours to perform polymerization. In order to increase polymerization conversion, the reaction was continued for further 1 hour at 80° C. and cooled to 60° C.

The large diameter graft acrylate-styrene-acrylonitrile polymer prepared by the above method has a particle size of 4500 Å, polymerization conversion was 99%, pH was 9.5 and graft rate was 45%.

The resulting large diameter graft acrylate-styrene-acrylonitrile resin was coagulated at atmospheric pressure with calcium chloride solution at 85° C., aged at 95° C., dehydrated, washed and dried using hot air at 90° C. for 30 minutes to obtain the large acrylate-styrene-acrylonitrile powder particles.

(C) Preparation of Alpha-methylstyrene-acrylonitrile Copolymer 70 parts by weight of alpha-methylstyrene, 30 parts by weight of acrylonitrile, 5 parts by weight of toluene, 0.135 parts by weight of 1,1-bis (tert-butylperoxi)-3,3,5 trimethyl-cyclohexane and 0.015 parts by weight of di-tert-butyl peroxide were homogenously mixed and continuously introduced to the reactor. The polymerization was carried out as the reaction temperature was kept at 110° C. After completion of the polymerization, the resulting polymer was supplied to a vaporizer equipped with a heat exchanger, kept at a temperature of 250° C. and a pressure of 20 Torr, in which non-reacted monomers and solvents were removed. Then, the polymer was palletized through an extruder equipped with a discharge pump. The alpha-methylstyrene-acrylonitrile copolymer prepared by the above method had an average molecular weight of $9.5 \times 10^4$ and a glass transition temperature (Tg) of 125° C.

(D) Preparation of Butadiene-styrene-methylmethacrylate Copolymer (D-1) Preparation of Polybutadiene Rubber Latex To a polymerization reactor purged with nitrogen gas, 80 parts by weight of ion exchange water, 100 parts by weight of 1,3-butadiene, 1.2 parts by weight of potassium rosinate and 1.5 parts by weight of potassium oleate as emulsifying agents, 0.7 parts by weight of sodium carbonate and 0.8 parts by weight of potassium bicarbonate as electrolytes, 0.3 parts by weight of tert-dodecylmercaptan as a molecular weight controller were simultaneously introduced. The reaction temperature was raised to 65° C. and 0.3 parts by weight of potassium persulfate as an initiator was added. Then, the reaction temperature was continuously raised to 85° C. for 35 hours and the reaction was terminated. The prepared rubber latex has an average particle size of about 3,500 Å and a gel content was about 75%.

(D-2) Preparation of Graft Butadiene-styrene-methylmethacrylate Copolymer

To a polymerization reactor purged with nitrogen gas, 10 parts by weight of polybutadiene rubber latex prepared as described above, 90 parts by weight of ion exchange water, 0.2 parts by weight of sodium oleate as an emulsifying agent, 14.38 parts by weight of methylmethacrylate, 5.62 parts by weight of styrene, 2.5 parts by weight of acrylonitrile, 0.048 parts by weight of sodium pyrophosphate, 0.001 parts by weight of iron(I) sulfide, 0.04 parts by weight of cumenehydroperoxide, 0.2 parts by weight of tert-dodecylmercaptan as a molecular weight controller were simultaneously introduced at 50° C. The reaction was carried out as the reaction temperature was raised to 73° C. over 2 hours. Then, a mixture of 70 parts by weight of ion exchange water, 0.4 parts by weight of sodium oleate, 43.12 parts by weight of methylmethacrylate, 16.88 parts by weight of styrene, 7.5 parts by weight of acrylonitrile, 0.048 parts by weight of sodium pyrophosphate, 0.001 parts by weight of iron (I) sulfide, 0.01 parts by weight of cumenehydroperoxide, 0.25 parts by weight of tert-dodecylmercaptan as a molecular weight controller were continuously added for 4 hours. Then, the temperature was raised to 76° C., and the reaction was aged for 1 hour, prior to completion. The polymerization conversion rate was 99.5% and solid content was 0.1%.

(E) Preparation of Acrylate Copolymer (E-1) First Step Reaction (Seed Polymerization)

339.8g of ion exchange water was introduced into a reactor and heated to 70° C. When the temperature of the ion exchange water was reached at 70° C., 49.85 g of butyl acrylate, 0.05g of ally methacrylate, 0.10 g of 1,3-butandiol dimethacrylate, 16.59 g of potassium stearate (in 8 wt % solution) were simultaneously introduced to the reactor. While the temperature of the reactor was kept at 70° C., 26.77 g of potassium persulfate (1 wt %) was added to the reactor for polymerizing a seed. The polymerized latex was measured for particle size using NICOMP, a laser light scattering device, and was found to have a particle size of 85 nm.

(E-2) Second Step Reaction (Polymerization of First Core Layer)

This step is to polymerize a first core layer. Ion exchange water 104.2 g, butyl acrylate 224.48 g, ally methacrylate 0.175 g, 1,3-butandiol dimethacrylate 0.35 g and 37.34 g of potassium stearate (in 8 wt % solution) were mixed to prepare a pre-emulsion. The resulting pre-emulsion was stabilized and continuously introduced to the seed latex prepared in the first step reaction at a uniform flow rate for 1 hour and 30 minutes. At the same time, 74.67 g of potassium persulfate (1 wt %) was continuously added for 1 hour and 30 minutes to carry out polymerization.

(E-3) Third Step Reaction (Polymerization of Second Core Layer)

This step is to polymerize a second core layer. Similarly to the second step reaction, a mixture of 104.2 g of ion exchange water and 224.18 g of butyl acrylate was continuously introduced to the latex, prepared in the second step reaction, at a uniform flow rate for 1 hour and 30 minutes. At the same time, 74.67 g of potassium persulfate (1 wt %) was continuously added for 1 hour and 30 minutes to carry out polymerization. Then, the reaction was aged for 1 hour at the reaction temperature of 70° C. to form a core part.

(E-4) Fourth Step Reaction (Polymerization of Shell)

This step is to polymerize a shell part around the core part prepared from the third step. Firstly, 197.5 g of ion exchange water, 117.75 g of methyl methacrylate, 9.25 g of ethyl acrylate and 13.8 g of potassium stearate (in 8 wt % solution) were mixed to prepare a pre-emulsion. To the latex prepared from the third step, the pre-emulsion and 69.2 g of potassium persulfate (in 1 wt % solution) were simultaneously and continuously introduced for 1 hour to carry out the reaction of the shell part. While the temperature in the reactor was kept constantly at 70° C., the reaction was aged for 1 hour to complete the polymerization. The final product had a particle size of 190 nm.

(F) Preparation of ASA Type Thermoplastic Resin 10 parts by weight of the small diameter acrylate-styrene-acrylonitrile powder particles (ASA-1), 28 parts by weight of the large diameter acrylate-styrene-acrylonitrile powder particles (ASA-2), 45 parts by weight of alpha-methylstyrene-acrylonitrile (AMS-SAN) resin, 15 parts by weight of butadiene-styrene-methylmethacrylate resin, 2 parts by weight of an acryl type copolymer resin, a stabilizer, a lubricant, and a light stabilizer were mixed and kneaded by extrusion to prepare acrylate-styrene-acrylonitrile type thermoplastic resin. The resulting ASA type thermoplastic resin was palletized using a 30 Φ twin screw extruder and formed into a specimen using an injection machine with cylinder temperature of 230° C. and mold temperature of 60° C. The specimen was measured for properties according to ASTM. The scratch resistance was examined by pencil hardness, the weatherability was examined by the accelerated weather resistance test. Colorability was examined by measuring L value and b value with a color difference meter when 1 parts by weight of a black pigment was added. In case of a pure ASA without blending as a standard, if an L value is in the negative (−) side, it means that the color saturation increases. The b value represents color combination of yellow and blue and generally, blue side (negative direction) means excellent color tone. Several resin compositions having the same rubber content were measured for their properties and the results are shown in Table 1.

i) Izod impact strength (¼ notched at 23° C., kg·cm/cm)—measured according to ASTM D256.

ii) Tensile strength (50 mm/min, kg/cm$^2$)—measured according to ASTM D638.

iii) Flow rate (220° C./10 Kg, g/10 min)—measured according to ASTM D1238.

iv) Thermal deformation temperature (18.5 kg/cm$^2$, ¼" unannealed)—measured according to ASTM D648.

v) Gloss—measured according to ASTM D523 at 45 degree.

vi) Scratch resistance—measured according to pencil hardness.

EXAMPLES 2 AND 3

The procedures of Example 1 were followed using the compositions described in Table 1 and the results are shown in Table 1.

TABLE 1

|  | Ex. 1 | Ex. 2 | Ex. 3 |
|---|---|---|---|
| ASA-1 | 10 | 10 | 10 |
| ASA-2 | 28 | 27 | 26 |
| AMS-SAN | 45 | 41 | 37 |
| Butadiene-styrene-methylmethacrylate | 15 | 20 | 25 |
| PMMA (EH910) | — | — | — |
| Acryl type copolymer | 2 | 2 | 2 |
| Physical Properties |  |  |  |
| Impact strength (23° C., Kg · cm/cm) | 14.7 | 15.2 | 15.8 |
| Low temperature impact strength (−20° C., kg · cm/cm) | 6.5 | 7 | 7.3 |
| Thermal deformation temperature (¼", 18.5 kg/cm$^2$) | 95.3 | 94.5 | 93.6 |
| Tensile strength (kg/cm$^2$) | 430 | 433 | 437 |
| Flow index (220° C., 10 kg, g/10 min) | 6 | 6.5 | 6.9 |
| Gloss (45 degree) | 88 | 91 | 94 |
| Pencil hardness | 2B | 2B | 2B |
| Color (ΔL) | −1.39 | −1.65 | −1.78 |
| (Δb) | −0.48 | −0.50 | −0.51 |
| Weatherability (ΔE) | 1.77 | 1.95 | 2.11 |

COMPARATIVE EXAMPLES 1 TO 8

The procedures of Example 1 were followed using the compositions described in Table 2 and the results are shown in Table 2. Polymethylmethacrylate (PMMA) used in the following Comparative Examples was EH910 (MFI=1.0) produced by LG MMA Company.

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| ASA-1 | 10 | 10 | 10 | 10 | 10 | 10 | 10 | 10 |
| ASA-2 | 35 | 32 | 35 | 31 | 31 | 31 | 23 | 34 |
| AMS-SAN | 55 | 43 | 40 | 44 | 39 | 34 | 25 | 49 |
| Butadiene-styrene-methylmethacrylate | — | 15 | — | — | — | — | 40 | 5 |
| PMMA (EH910) | — | — | 15 | 15 | 20 | 25 | — | — |
| Acryl type copolymer | — | — | — | 2 | 2 | 2 | 2 | 2 |
| Physical Properties |  |  |  |  |  |  |  |  |
| Impact strength (23° C., Kg · cm/cm) | 15.4 | 15.7 | 15 | 15.1 | 15.2 | 15 | 15.8 | 15.5 |
| Low temperature impact strength ('−20° C., kg · cm/cm) | 3.5 | 5.4 | 3.2 | 3 | 3.1 | 3 | 7.3 | 4.8 |
| Thermal deformation temperature (¼", 18.5 kg/cm$^2$) | 96 | 95.1 | 94.8 | 95.6 | 94.7 | 94.1 | 92.2 | 96 |
| Tensile strength (kg/cm$^2$) | 415 | 422 | 428 | 422 | 429 | 435 | 425 | 420 |
| Flow index (220° C., 10 kg, g/10 min) | 4.5 | 6 | 3.8 | 3.7 | 3.4 | 3.1 | 7.8 | 5.1 |
| Gloss (45 degree) | 80 | 85 | 78 | 83 | 85 | 86 | 95 | 83 |
| Pencil hardness | 4B | 2B | 2B | 2B | 2B | B | B | 3B |
| Color (ΔL) | Standard | −1.77 | −1.18 | −1.40 | −1.68 | −1.72 | −1.77 | −1.05 |
| (Δb) | Standard | −0.10 | −0.17 | −0.44 | −0.47 | −0.48 | −0.51 | −0.25 |
| Weatherability (ΔE) | 1.45 | 1.75 | 1.44 | 1.5 | 1.48 | 1.5 | 3.55 | 1.56 |

As shown in Tables 1 and 2, it was confirmed that by blending butadiene-styrene-methylmethacrylate copolymers, scratch resistance, Gloss, color tone and low temperature impact strength were improved and by a small amount of an acryl type copolymer, color tone (particularly b value) was unexpectedly further improved. As the content of the butadiene-styrene-methylmethacrylate copolymer increases, all the desired appearance properties were improved, however weatherability was reduced when exceeding a certain amount (Comparative Example 7) and scratch resistance was not improved when being lower than a certain amount (Comparative Example 8).

EXAMPLES 4 TO 8

The procedures of Example 1 were followed using the compositions described in Table 3, in which an acryl type copolymer was used as an additive.

TABLE 3

|  | Ex. 4 | Ex. 5 | Ex. 6 | Ex. 7 | Ex. 8 | Comp. Ex. 9 | Comp. Ex. 10 |
| --- | --- | --- | --- | --- | --- | --- | --- |
| ASA-1 | 15 | 20 | 25 | 25 | 25 | — | 40 |
| ASA-2 | 30 | 26 | 22 | 22 | 22 | 42 | 10 |
| AMS-SAN | 40 | 39 | 38 | 38 | 38 | 43 | 35 |
| Butadiene-styrene-methylmethacrylate | 15 | 15 | 15 | 15 | 15 | 15 | 15 |
| Acryl type copolymer | 2 | 2 | 2 | 4 | 6 | 2 | 2 |
| Properties |  |  |  |  |  |  |  |
| Impact strength (23° C., Kg · cm/cm) | 16.8 | 14.1 | 11.7 | 13.1 | 15.8 | 25.8 | 6.3 |
| Low temperature impact strength ('−20° C., kg · cm/cm) | 5.4 | 5.3 | 5.1 | 5.3 | 5.5 | 3.8 | 2.7 |
| Thermal deformation temperature (¼", 18.5 kg/cm$^2$) | 95 | 94.9 | 94.8 | 94.6 | 94.5 | 94.6 | 93.1 |
| Tensile strength (kg/cm$^2$) | 410 | 418 | 427 | 415 | 402 | 400 | 440 |
| Flow index (220° C., 10 kg, g/10 min) | 4.8 | 4.9 | 5.1 | 4.8 | 4.3 | 3.1 | 5.3 |
| Gloss (45 degree) | 89 | 92 | 94 | 95 | 95 | 83 | 98 |
| Pencil hardness | 2B | 2B | 2B | 2B | 2B | 3B | 2B |
| *Color (ΔL) | −1.38 | −1.42 | −1.50 | −1.48 | −1.50 | −0.34 | −1.77 |
| (Δb) | −0.50 | −0.53 | −0.60 | −0.72 | −0.77 | 0.09 | −1.05 |
| Weatherability (ΔE) | 1.75 | 1.76 | 1.74 | 1.77 | 1.75 | 1.71 | 1.73 |

*Color was measured using pure ASA (Comparative Example 1) as a standard.

COMPARATIVE EXAMPLES 9 AND 10

The procedures of Example 1 were followed using the compositions of Table 3. As shown in Table 3, it was confirmed that when an added amount of acryl type copolymer as an additive was increased, the appearance properties and impact strength were improved. However, when small diameter acrylate-styrene-acrylonitrile resin (ASA-1) was not used (Comparative Example 9), some appearance properties such as gloss and color were not improved. In other hand, when it was used in an amount exceeding a certain range (Comparative Example 10), the impact strength was greatly reduced.

INDUSTRIAL APPLICABILITY

As described above, the acrylate-styrene-acrylonitrile type thermoplastic resin composition according to the present invention has excellent appearance properties such as scratch resistance, gloss, color, as compared to conventional ASA resins, as well as excellent basic physical properties such as impact strength, thermal resistance, flowability, etc. and weatherability.

While the present invention has been described with reference to the preferred examples, it is to be appreciated that those skilled in the art can make change or modification thereof without departing from the scope and spirit of the present invention and such change or modification fall in the scope of the present invention.

What is claimed is:

1. A thermoplastic resin composition comprising:
   (1) 5 to 30 parts by weight of a graft alkyl acrylate-styrene-acrylonitrile having an average particle size of 500 to 2000 Å;
   (2) 10 to 40 parts by weight of a graft alkyl acrylate-styrene-acrylonitrile having an average particle size of 2500 to 5000 Å;
   (3) 10 to 70 parts by weight of an aromatic vinyl compound-vinylcyanide copolymer;
   (4) 10 to 30 parts by weight of a butadiene-styrene-methylmethacrylate resin; and
   (5) 1 to 10 parts by weight of an alkyl acrylate copolymer, based on 100 parts by weight of the sum of (1), (2), (3) and (4).

2. The thermoplastic resin composition according to claim 1, wherein the graft alkyl acrylate-styrene-acrylonitrile having an average particle size of 500 to 2000 Å comprises:
   5 to 50 parts by weight of a alkyl acrylate rubber latex having an average particle size of 500 to 2000 Å;
   10 to 50 parts by weight of an aromatic vinyl compound; and
   1 to 20 parts by weight of a vinylcyanide compound.

3. The thermoplastic resin composition according to claim 1, wherein the graft alkyl acrylate-styrene-acrylonitrile having an average particle size of 2500 to 5000 Å comprises:
   10 to 60 parts by weight of a alkyl acrylate rubber latex having an average particle size of 2500 to 5000Å;

10 to 40 parts by weight of an aromatic vinyl compound; and 1 to 20 parts by weight of a vinylcyanide compound.

4. The thermoplastic resin composition according to claim 2, wherein the alkyl acrylate rubber latex is prepared from an alkyl acrylate monomer by emulsion polymerization with an emulsifying agent, an initiator, a grafting agent, a crosslinking agent and an electrolyte as additives.

5. The thermoplastic resin composition according to claim 4, wherein the alkyl acrylate monomer is butyl acrylate or ethyl hexylacrylate.

6. The thermoplastic resin composition according to claim 1, wherein the aromatic vinyl compound-vinylcyanide compound copolymer comprises:

60 to 75 parts by weight of an aromatic vinyl compound; and 25 to 40 parts by weight of a vinylcyanide.

7. The thermoplastic resin composition according to claim 1, wherein the butadiene-styrene-methylmethacrylate copolymer comprises:

8 to 20 parts by weight of a polybutadiene rubber latex;

40 to 70 parts by weight of a methacrylic acid alkyl ester compound or an acrylic acid alkyl ester compound;

15 to 30 parts by weight of an aromatic vinyl compound; and 1 to 10 parts by weight of a vinylcyanide compound.

8. The thermoplastic resin composition according to claim 2, wherein the aromatic vinyl compound is at least one selected from the group consisting of styrene, alpha-methylstyrene and para-methylstyrene.

9. The thermoplastic resin composition according to claim 2, wherein the vinylcyanide compound is acrylonitrile.

10. The thermoplastic resin composition according to claim 1, wherein the alkyl acrylate copolymer has a core-shell structure, in which the core comprises acrylate rubber particles, each particle comprising a seed comprising 4.9 to 14.9 parts by weight of $C_2$-$C_8$ alkyl acrylate and 0.1 to 5.0 parts by weight of a crosslinking agent, a first core layer comprising 40 to 90 parts by weight of $C_2$-$C_8$ alkyl acrylate and 0.1 to 5.0 parts by weight of a crosslinking agent, and a second core layer comprising 40 to 90 parts by weight of $C_2$-$C_8$ alkyl acrylate; and the shell comprises 5 to 30 parts by weight of $C_1$-$C_4$ alkyl methacrylate.

11. The thermoplastic resin composition according to claim 10, wherein the alkyl acrylate is at least one selected from the group consisting of methyl acrylate, ethyl acrylate, propyl acrylate, isopropyl acrylate, butyl acrylate, hexyl acrylate, octyl acrylate and 2-ethylhexyl acrylate.

12. The thermoplastic resin composition according to claim 3, wherein the alkyl acrylate rubber latex is prepared from an alkyl acrylate monomer by emulsion polymerization with an emulsifying agent, an initiator, a grafting agent, a crosslinking agent and an electrolyte as additives.

13. The thermoplastic resin composition according to claim 3, wherein the aromatic vinyl compound is at least one selected from the group consisting of styrene, alpha-methylstyrene and para-methylstyrene.

14. The thermoplastic resin composition according to claim 6, wherein the aromatic vinyl compound is at least one selected from the group consisting of styrene, alpha-methylstyrene and para-methylstyrene.

15. The thermoplastic resin composition according to claim 7, wherein the aromatic vinyl compound is at least one selected from the group consisting of styrene, alpha-methylstyrene and para-methylstyrene.

16. The thermoplastic resin composition according to claim 3, wherein the vinylcyanide compound is acrylonitrile.

17. The thermoplastic resin composition according to claim 6, wherein the vinylcyanide compound is acrylonitrile.

18. The thermoplastic resin composition according to claim 7, wherein the vinylcyanide compound is acrylonitrile.

* * * * *